US012620862B2

(12) United States Patent
Miyazono

(10) Patent No.: US 12,620,862 B2
(45) Date of Patent: May 5, 2026

(54) COOLING STRUCTURE OF IN-WHEEL MOTOR

(71) Applicant: TOYOTA JIDOSHA KABUSHIKI KAISHA, Toyota (JP)

(72) Inventor: Hideaki Miyazono, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 520 days.

(21) Appl. No.: 18/112,764

(22) Filed: Feb. 22, 2023

(65) Prior Publication Data

US 2023/0327511 A1 Oct. 12, 2023

(30) Foreign Application Priority Data

Apr. 6, 2022 (JP) .................................. 2022-063625

(51) Int. Cl.
| | |
|---|---|
| *H02K 5/18* | (2006.01) |
| *B60K 1/00* | (2006.01) |
| *B60K 7/00* | (2006.01) |
| *B60K 11/06* | (2006.01) |
| *H02K 9/02* | (2006.01) |
| *H02K 9/22* | (2006.01) |

(52) U.S. Cl.
CPC ................. *H02K 5/18* (2013.01); *B60K 1/00* (2013.01); *B60K 7/0007* (2013.01); *B60K 2001/006* (2013.01)

(58) Field of Classification Search
CPC .. H02K 5/18; H02K 9/00; H02K 9/02; H02K 9/19; H02K 9/193; H02K 9/22; H02K 9/227; B60K 1/00; B60K 2001/006; B60K 7/00; B60K 7/0007; B60K 2007/0092; B60K 11/06; B60G 3/20; B60G 2206/50; B62D 7/18

See application file for complete search history.

(56) References Cited

U.S. PATENT DOCUMENTS

| | | | | |
|---|---|---|---|---|
| 5,087,229 | A | * | 2/1992 | Hewko ................ B60K 7/0007 |
| | | | | 475/149 |
| 5,111,090 | A | * | 5/1992 | Otake ...................... H02K 9/19 |
| | | | | 180/229 |
| 5,163,528 | A | * | 11/1992 | Kawamoto .......... B60K 17/145 |
| | | | | 310/67 R |
| 5,412,269 | A | * | 5/1995 | Couture ............... B60K 7/0007 |
| | | | | 310/67 R |
| 7,249,644 | B2 | * | 7/2007 | Honda .................... B60L 50/66 |
| | | | | 310/68 B |
| 7,703,779 | B2 | * | 4/2010 | Sumey ..................... B60T 5/00 |
| | | | | 280/93.512 |

(Continued)

FOREIGN PATENT DOCUMENTS

| | | | | | |
|---|---|---|---|---|---|
| DE | 102023003456 | B3 | * | 8/2024 | ............. B60K 11/02 |
| JP | H03112724 | A | * | 5/1991 | |

(Continued)

*Primary Examiner* — Edgardo San Martin
(74) *Attorney, Agent, or Firm* — Sughrue Mion, PLLC

(57) ABSTRACT

A cooling structure of an in-wheel motor includes a rotary electric machine and a knuckle. The rotary electric machine is configured to rotate a hub to which a wheel is fixed. The knuckle rotatably supports the hub and is provided in contact with a stator of the rotary electric machine. Here, the knuckle is provided with one or more cooling fins extending in the axial direction of the tire-wheel assembly.

10 Claims, 4 Drawing Sheets

(56)          References Cited

U.S. PATENT DOCUMENTS

| | | | | |
|---|---|---|---|---|
| 8,376,072 | B2 * | 2/2013 | Sagara | H02K 5/08 |
| | | | | 903/952 |
| 9,306,430 | B2 * | 4/2016 | Cho | H02K 7/116 |
| 9,731,572 | B2 * | 8/2017 | Tamura | B60G 15/062 |
| 10,011,164 | B2 * | 7/2018 | Tamura | B60G 3/22 |
| 2006/0158050 | A1 | 7/2006 | Maeda et al. | |
| 2008/0067882 | A1 * | 3/2008 | Murata | B60L 3/0061 |
| | | | | 310/54 |
| 2009/0000840 | A1 * | 1/2009 | Murata | B60K 17/046 |
| | | | | 180/65.6 |
| 2012/0235462 | A1 * | 9/2012 | Yamamoto | B60K 17/046 |
| | | | | 301/6.5 |
| 2023/0098893 | A1 | 3/2023 | Yada et al. | |
| 2023/0294619 | A1 | 9/2023 | Murata et al. | |

FOREIGN PATENT DOCUMENTS

| | | | | | | |
|---|---|---|---|---|---|---|
| JP | 2005-335623 | A | | 12/2005 | | |
| JP | 2006240429 | A | * | 9/2006 | | H02K 9/19 |
| JP | 2008273406 | A | * | 11/2008 | | |
| JP | 4383802 | B2 | * | 12/2009 | | F16H 57/0415 |
| JP | 2010-148272 | A | | 7/2010 | | |
| JP | 2011-024387 | A | | 2/2011 | | |
| JP | 4817800 | B2 | * | 11/2011 | | |
| JP | 5673518 | B2 | * | 2/2015 | | |
| JP | 2015190566 | A | * | 11/2015 | | |
| JP | 2016-025718 | A | | 2/2016 | | |
| JP | 2016067158 | A | * | 4/2016 | | |
| JP | 2021-192999 | A1 | | 12/2021 | | |
| KR | 20110027261 | A | * | 3/2011 | | H02K 9/227 |
| KR | 20140006253 | A | * | 1/2014 | | B60K 7/0007 |
| KR | 20170001480 | A | * | 1/2017 | | B60K 7/0007 |
| WO | 2022014511 | A1 | | 1/2022 | | |
| WO | WO-2024158268 | A1 | * | 8/2024 | | B60T 13/74 |

* cited by examiner

FRONT SIDE
OF THE VEHICLE

REAR SIDE
OF VEHICLE

COOLING STRUCTURE OF IN-WHEEL MOTOR

CROSS-REFERENCE TO RELATED APPLICATION

This application claims priority to Japanese Patent Application No. 2022-063625 filed on Apr. 6, 2022, incorporated herein by reference in its entirety.

BACKGROUND

1. Technical Field

The present disclosure relates to a cooling structure of an in-wheel motor.

2. Description of Related Art

Japanese Unexamined Patent Application Publication No. 2010-148272 (JP 2010-148272 A) discloses a technology that is a cooling device of an in-wheel motor, in which a motor heat dissipation fin is disposed at a position that is an outer peripheral portion of a housing to which a stator is fixed and that is a lower portion of the in-wheel motor, and in which a cooling fan is provided outside the in-wheel motor to cool the motor heat dissipation fin.

SUMMARY

However, in the technology disclosed in JP 2010-148272 A, there is room for improvement in the cooling performance.

The present disclosure has been made in view of the above problems, and an object thereof is to provide a cooling structure of an in-wheel motor capable of improving the cooling performance.

A cooling structure of an in-wheel motor according to a first aspect of the present disclosure is a cooling structure of an in-wheel motor provided in a wheel of a tire-wheel assembly.

The cooling structure of the in-wheel motor includes: a rotary electric machine configured to rotate a hub to which the wheel is fixed; and a knuckle that supports the hub so as to be rotatable and that is provided in contact with a stator of the rotary electric machine. Here, the knuckle is provided with one or more cooling fins extending in an axial direction of the tire-wheel assembly.

According to such a configuration, the cooling fin is provided in the knuckle to which heat is transferred from the stator of the rotary electric machine in consideration of a flow direction of wind in the wheel. Therefore, the cooling performance of the in-wheel motor can be improved.

In the cooling structure according to the first aspect, the cooling fin may be disposed on a side surface in a circumferential direction of a leg portion on a vehicle rear side of the knuckle.

According to such a configuration, it is possible to improve the cooling performance by disposing the cooling fin in a portion having a high wind speed.

In the cooling structure according to the first aspect, the cooling fin may be disposed only on a vehicle rear side of the knuckle.

According to such a configuration, it is possible to efficiently improve the cooling performance while achieving cost reduction by reducing the number of cooling fins.

A cooling device of an in-wheel motor according to the present disclosure has an effect of the improving cooling performance by providing a cooling fin in a knuckle to which heat is transferred from a stator of a rotary electric machine, in consideration of a flow direction of wind in a wheel.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of a cooling structure of an in-wheel motor according to the present disclosure will be described. This embodiment is not intended to limit the present disclosure.

Figure 1:
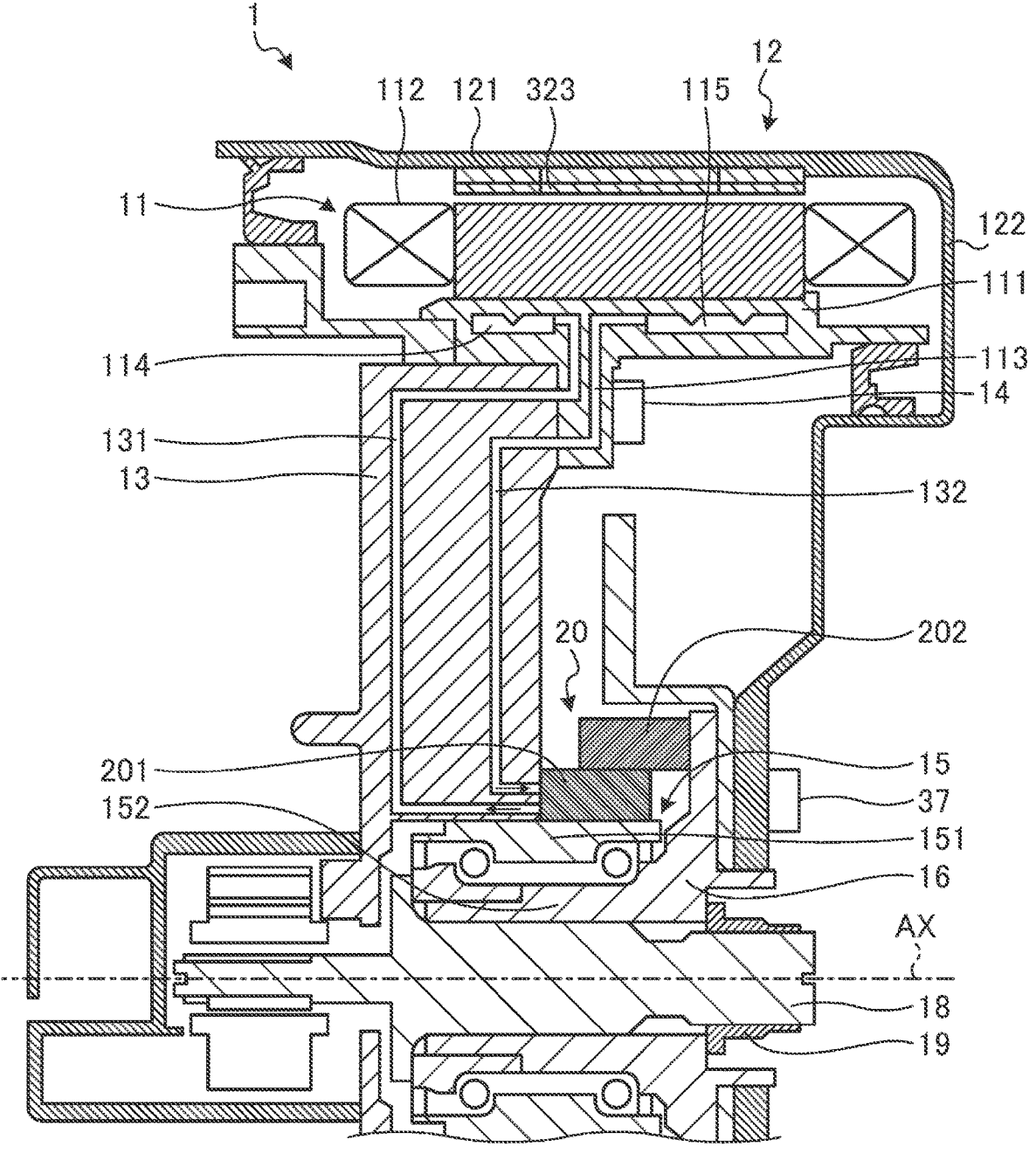
FIG. 1 is a cross-sectional view illustrating a schematic configuration of an in-wheel motor according to an embodiment.

FIG. 1 is a cross-sectional view illustrating a schematic configuration of an in-wheel motor 1 according to an embodiment. The in-wheel motor 1 according to the embodiment includes a stator 11 and a rotor 12. The in-wheel motor 1 is provided in a wheel of a tire-wheel assembly. The stator 11 includes a stator core 111, a stator coil 112, and a stator spindle 113. Further, the stator coils 112 are arranged at equal intervals around the stator 11 having a substantially ring shape. The stator coil 112 can generate a rotating magnetic field at a predetermined speed by receiving electric power from a battery. The stator spindle 113 is fixed to a knuckle 13 fixed to the suspension arm by a bolt 14. The knuckle 13 rotatably supports the hub 16 via a hub bearing 15 in which a plurality of balls are disposed between the outer race (outer ring) 151 and the inner race (inner ring) 152.

A rotor 12 having a rim portion 121 and a disk portion 122 is disposed outside the stator 11. The rotor 12 is rotatably disposed at a predetermined interval from the stator 11. In the in-wheel motor 1 according to the embodiment, the rotor 12 includes a rim portion 121 and a disk portion 122, which are constituent elements constituting a wheel of a tire-wheel assembly. The rim portion 121 is located on the radially outer side of the stator 11. The disk portion 122 is located outside in the axial direction of the stator 11. In the present embodiment, the "axial direction" is a direction in which an axial AX of an axle 18 to be described later extends, unless otherwise specified. On the inner peripheral side of the rim portion 121, a magnet 123 such as a permanent magnet is disposed so as to face the stator core 111 of the stator 11, so that the rotor 12 rotates with respect to the stator 11 with the movement of the rotating magnetic field. Since the rotor 12 is fixed to the hub 16 by the hub bolt 17, the tire-wheel assembly can be rotated at a predetermined speed by the rotation of the rotor 12.

The axle 18 corresponds to a rotary shaft of a tire-wheel assembly on which the in-wheel motor 1 is mounted, and is rotatable about an axial AX, and an end portion on an outer side of the vehicle is fixed to the hub 16 by a locking ring 19.

The mechanical pump 20 is, for example, an oil pump that pumps a coolant (oil) that is a refrigerant. An inner race 201, which is a fixing portion constituting the pump 20, is attached to the outer race 151 of the hub bearing 15, and an outer race 202, which is a rotating portion constituting the pump 20, is attached to the hub 16. As the outer race 202 rotates with the rotation of the hub 16, the pump 20 is driven by the rotational difference between the inner race 201 and the outer race 202. Instead of the mechanical pump 20, an electric pump may be used. At this time, the electric pump may be provided in the outer race 151 of the hub bearing 15.

Inside the stator core 111, a first cooling flow path 114 and a second cooling flow path 115, which are flow paths that extend in the circumferential direction of the stator 11 and through which the cooling liquid flows, are arranged side by side in the axial direction. The first cooling flow path 114 and the second cooling flow path 115 are partially in communication with each other in the stator core 111.

The inside of the knuckle 13 and the inside of the stator 11 (the stator core 111 and the stator spindle 113) are provided with the first cooling flow path 114 and the second cooling flow path 115 in the stator core 111, and the forward flow path 131 and the return flow path 132 which are a plurality of flow paths for circulating the cooling liquid between the pump 20 so as to communicate with each other. The connecting portion between the knuckle 13 and the stator 11 (stator spindle 113) in the forward flow path 131 and the return flow path 132 is a position where the bolt 14 for fastening the knuckle 13 and the stator spindle 113 in the circumferential direction of the stator 11 is not present. In addition, a gasket (not shown) is inserted into a connection portion between the knuckle 13 and the stator 11 (stator spindle 113) in the forward flow path 131 and the return flow path 132, and the sealing property at the connection portion is ensured.

The inflow end of the forward flow path 131 communicates with the discharge port of the pump 20, and the outflow end of the forward flow path 131 communicates with the first cooling flow path 114 in the stator core 111. Further, the inflow-side end portion of the return flow path 132 communicates with the second cooling flow path 115 in the stator core 111, and the outflow-side end portion of the return flow path 132 communicates with the inflow port of the pump 20.

Note that the knuckle 13 may be provided with a flow path for allowing a cooling liquid such as the forward flow path 131 and the return flow path 132 to flow therethrough by increasing its physique as necessary in consideration of strength and the like. As a method of providing the forward flow path 131 and the return flow path 132 in the knuckle 13, for example, a groove corresponding to the forward flow path 131 and the return flow path 132 may be dug on the wall surface of the knuckle 13 by drilling or the like, and then the groove may be covered with a lid member. Further, for example, when the knuckle 13 is manufactured by casting, a core may be provided in a portion corresponding to the forward flow path 131 and the return flow path 132, so that the forward flow path 131 and the return flow path 132 may be provided in the knuckle 13.

In the in-wheel motor 1 according to the embodiment, the pump 20 is driven in accordance with the rotation of the hub 16, so that the cooling liquid discharged from the pump 20 circulates in the order of the forward flow path 131, the first cooling flow path 114, the second cooling flow path 115, and the return flow path 132 as shown in FIG. 1 so as to flow through the respective flow paths and return to the pump 20.

In the in-wheel motor 1 according to the embodiment, the cooling liquid is circulated by the pump 20. The cooling liquid flowing through the first cooling flow path 114 and the second cooling flow path 115 removes heat from the stator core 111, thereby cooling the stator core 111 and thus the stator 11. Further, the cooling liquid that has received the heat from the stator core 111 flows out from the second cooling flow path 115 to the return flow path 132, flows through the return flow path 132, the pump 20, and the forward flow path 131 in this order, and the heat of the cooling liquid is transferred to the knuckle 13 in the forward flow path 131 and the return flow path 132 until the cooling liquid flows into the first cooling flow path 114 again, and is dissipated to the air flowing around the knuckle 13.

As described above, in the in-wheel motor 1 according to the embodiment, by driving the pump 20 with the rotation of the hub 16, the cooling liquid is circulated between the first cooling flow path 114 and the second cooling flow path 115 and the pump via the forward flow path 131 and the return flow path 132. With such a configuration, the stator core 111 and thus the stator 11 can be cooled by the coolant while the coolant is flowing through the forward flow path 131 and the return flow path 132.

In the in-wheel motor 1 according to the embodiment, since the stator 11 (the stator spindle 113) and the knuckle 13 are in contact with each other, the heat of the stator 11 is transmitted to the knuckle 13. The heat transferred to the knuckle 13 in this manner is dissipated to the air flowing around the knuckle 13.

Figure 2:
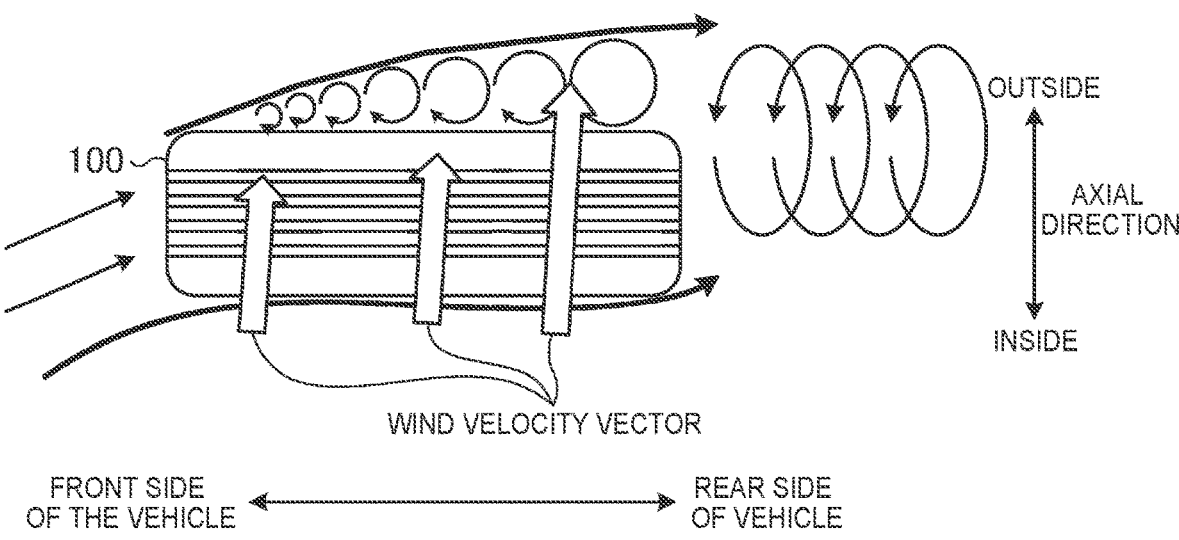
FIG. 2 is a view showing a flow of wind around a tire-wheel assembly on which an in-wheel motor is mounted during vehicle running.

Here, as shown in FIG. 2, during vehicle traveling, the wind in the wheel of the tire-wheel assembly 100 on which the in-wheel motor 1 is mounted flows from the inside to the outside in the axial direction. Further, the wind speed of the wind flowing in the wheel of the tire-wheel assembly 100 increases toward the vehicle rear side.

Figure 3:
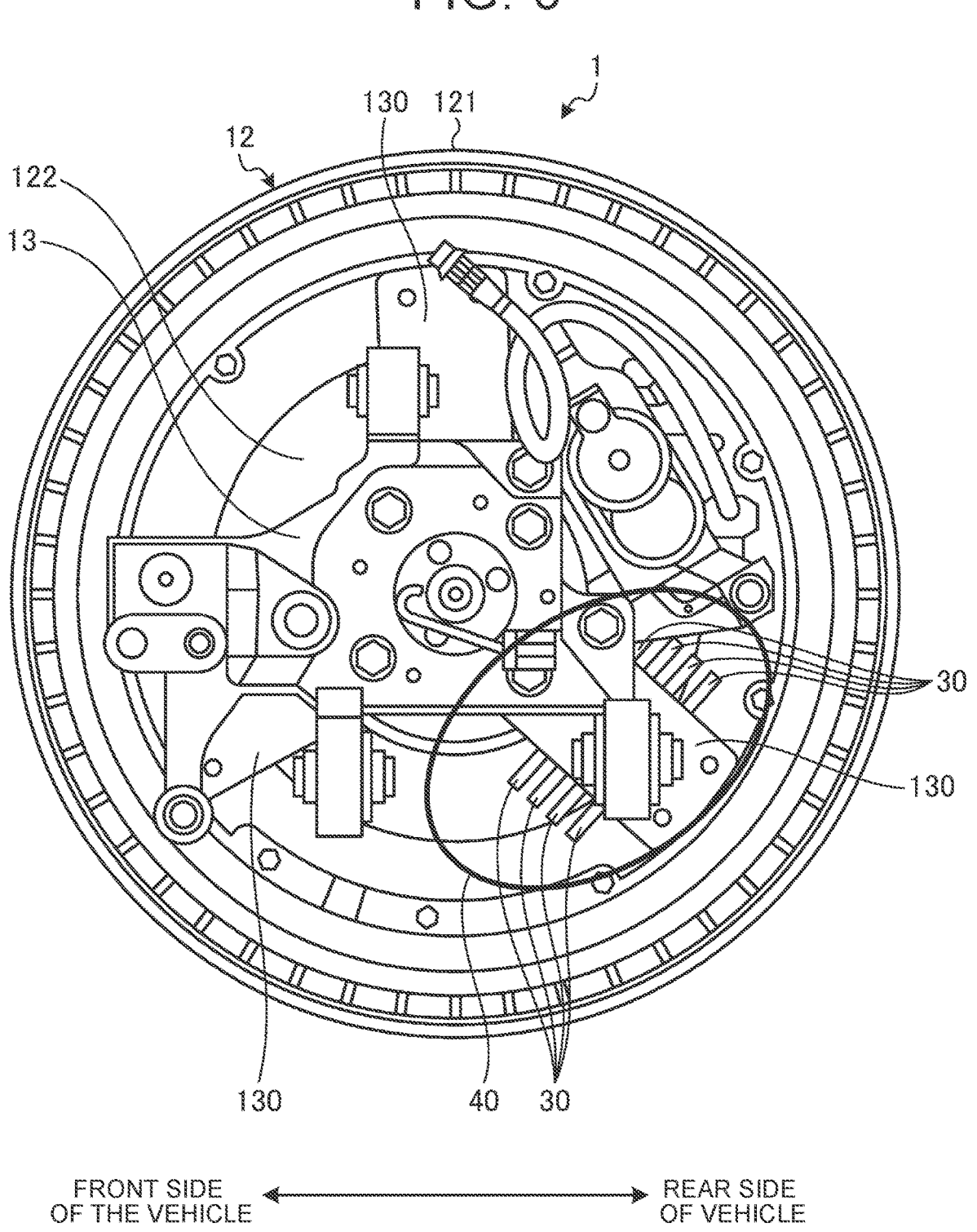
FIG. 3 is a view of an in-wheel motor in which cooling fins are arranged on a leg portion located on a vehicle rear side of a knuckle as viewed from the inside in an axial direction.
Figure 4:
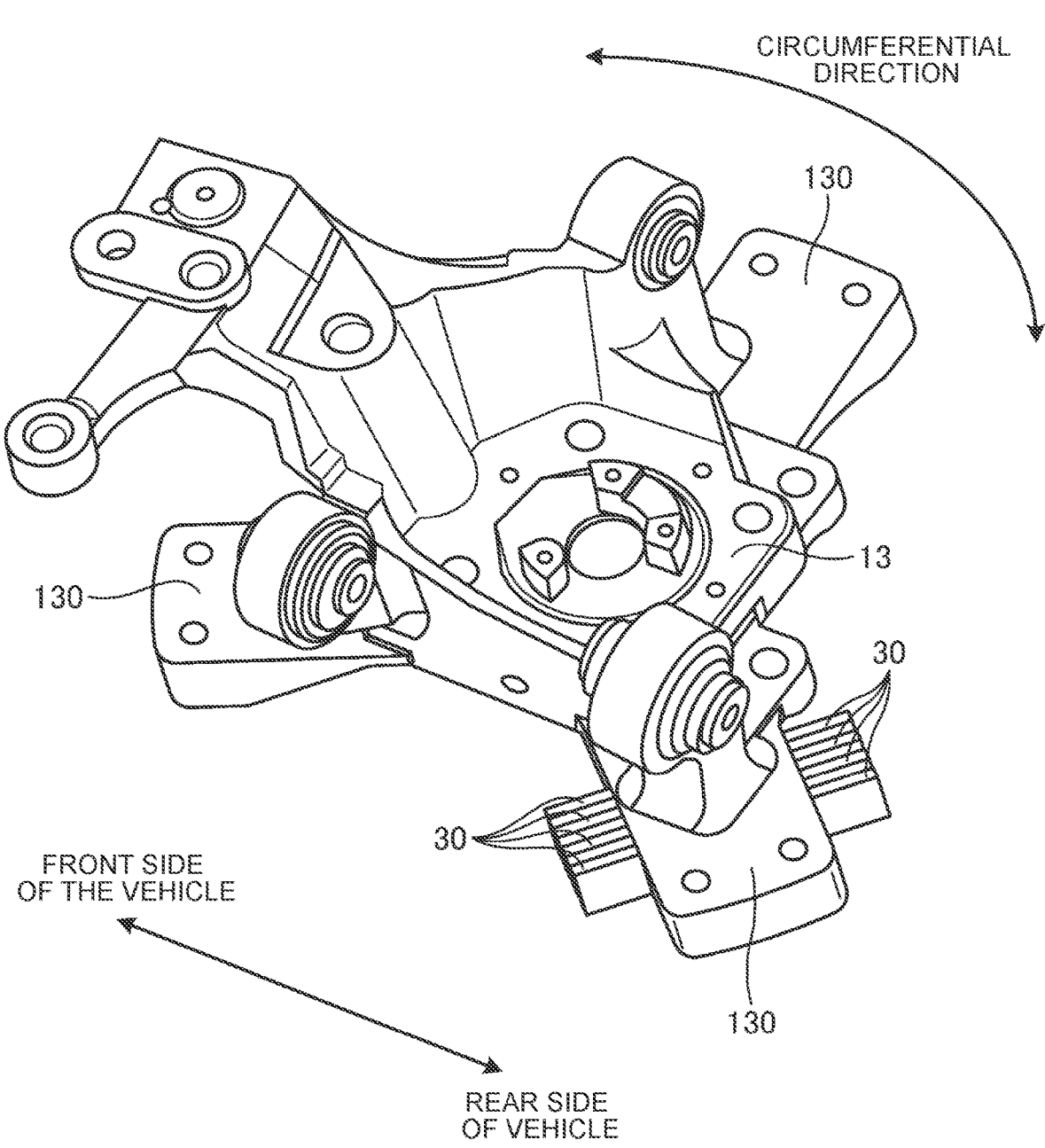
FIG. 4 is a perspective view of a knuckle in which a cooling fin is disposed on a leg portion located on a vehicle rear side.

Therefore, as the cooling structure of the in-wheel motor 1 according to the embodiment, as shown in FIGS. 3 and 4, one or more cooling fins 30 extending in the axial direction are provided in the leg portion 130 of the knuckle 13 so as to follow the wind flow in consideration of the wind flow direction in the wheel. Specifically, in the cooling structure of the in-wheel motor 1 according to the embodiment, the cooling fins 30 are disposed on the circumferential side surfaces of the leg portions 130 located on the vehicle rear side of the knuckle 13 in consideration of the portion 40 having a high wind speed in the wheel during vehicle running. In addition, a plurality (eight) of the cooling fins 30 are arranged so as to extend in the axial direction. Thus, in the cooling structure of the in-wheel motor 1 according to the embodiment, the heat of the knuckle 13 can be efficiently dissipated from the cooling fin 30, and the cooling performance of the knuckle 13 and thus the cooling performance of the stator 11 can be improved as compared with the case where the cooling fin 30 is not provided in the knuckle 13.

Note that, as the arrangement position of the cooling fin 30 with respect to the knuckle 13, it is sufficient that the cooling fin 30 is provided to the knuckle 13 so as to extend in the axial direction so as to follow the flow of the wind in consideration of the flow direction of the wind in the wheel while the vehicle is traveling. Therefore, the cooling fins may be disposed not only on the vehicle rear side of the knuckle 13 but also at other positions of the knuckle 13. For example, the cooling fins 30 may be arranged on the circumferential side surface of the leg portion 130 located on the vehicle front side of the knuckle 13 so that the cooling fins 30 extend in the axial direction. On the other hand, by arranging the cooling fins 30 only on the vehicle rear side of the knuckle 13, it is possible to efficiently improve the cooling performance while reducing the number of the cooling fins and reducing the cost.

What is claimed is:

1. A cooling structure of an in-wheel motor, the cooling structure being provided in a wheel of a tire-wheel assembly, the cooling structure comprising:

a rotary electric machine configured to rotate a hub to which the wheel is fixed; and a knuckle that supports the hub so as to be rotatable and that is provided in contact with a stator of the rotary electric machine, wherein the knuckle is provided with one or more cooling fins extending in an axial direction of the tire-wheel assembly, wherein the one or more cooling fins is disposed on a side surface in a circumferential direction of a leg portion on a vehicle rear side of the knuckle.

2. A cooling structure of an in-wheel motor, the cooling structure being provided in a wheel of a tire-wheel assembly, the cooling structure comprising:

a rotary electric machine configured to rotate a hub to which the wheel is fixed; and a knuckle that supports the hub so as to be rotatable and that is provided in contact with a stator of the rotary electric machine, wherein the knuckle is provided with one or more cooling fins extending in an axial direction of the tire-wheel assembly, wherein the one or more cooling fins is disposed only on a vehicle rear side of the knuckle.

3. The cooling structure according to claim 1, wherein an inside of the knuckle and an inside of the stator are provided with a forward flow path and a return flow path for circulating a cooling liquid, and the forward flow path and the return flow path are connected to a pump that is driven as the hub rotates.

4. The cooling structure according to claim 2, wherein an inside of the knuckle and an inside of the stator are provided with a forward flow path and a return flow path for circulating a cooling liquid, and the forward flow path and the return flow path are connected to a pump that is driven as the hub rotates.

5. The cooling structure according to claim 1, wherein the side surface in the circumferential direction of the leg portion includes a first side surface and a second side surface that is opposite from the first side surface and in the circumferential direction of the leg portion, and the one or more cooling fins extend from each of the first side surface and the second side surface of the leg portion.

6. The cooling structure according to claim 2, wherein the one or more cooling fins is disposed on a side surface in a circumferential direction of a leg portion of the knuckle.

7. The cooling structure according to claim 1, wherein the vehicle rear side of the knuckle is located rearward of a rotary shaft of the wheel on which the in-wheel motor is mounted.

8. The cooling structure according to claim 2, wherein the vehicle rear side of the knuckle is located rearward of a rotary shaft of the wheel on which the in-wheel motor is mounted.

9. The cooling structure according to claim 1, wherein the leg portion of the knuckle further includes an exterior facing surface and an interior facing surface, and the side surface in the circumferential direction of the leg portion extends from the exterior facing surface to the interior facing surface.

10. The cooling structure according to claim 6, wherein the leg portion of the knuckle further includes an exterior facing surface and an interior facing surface, and the side surface in the circumferential direction of the leg portion extends from an edge of the exterior facing surface to an edge of the interior facing surface.

* * * * *